(12) United States Patent
Park et al.

(10) Patent No.: US 8,437,250 B2
(45) Date of Patent: May 7, 2013

(54) DETERMINING PATHS THAT SATISFY A RELIABILITY REQUIREMENT

(75) Inventors: Sung I. Park, Irvine, CA (US); Denh T. Sy, Rosemead, CA (US); Erwin W. Bathrick, Yorba Linda, CA (US)

(73) Assignee: Raytheon Company, Waltham, MA (US)

( * ) Notice: Subject to any disclaimer, the term of this patent is extended or adjusted under 35 U.S.C. 154(b) by 453 days.

(21) Appl. No.: 12/780,022

(22) Filed: May 14, 2010

(65) Prior Publication Data

US 2010/0290338 A1 Nov. 18, 2010

Related U.S. Application Data

(60) Provisional application No. 61/178,873, filed on May 15, 2009.

(51) Int. Cl.
*H04L 1/00* (2006.01)
*H04W 40/00* (2009.01)
*G06F 15/173* (2006.01)

(52) U.S. Cl.
USPC .................. 370/225; 455/445; 709/239

(58) Field of Classification Search .................. None
See application file for complete search history.

(56) References Cited

U.S. PATENT DOCUMENTS

| | | | | |
|---|---|---|---|---|
| 7,269,132 B1 * | 9/2007 | Casey et al. | | 370/219 |
| 7,853,715 B1 * | 12/2010 | Katukam et al. | | 709/239 |
| 2001/0032271 A1 * | 10/2001 | Allen | | 709/239 |
| 2002/0042274 A1 * | 4/2002 | Ades | | 455/445 |

OTHER PUBLICATIONS

Perkins, Charles E., et al., "*Ad hoc On-Demand Distance Vector (AODV) Routing*" draft-ietf-manet-aodv-13.txt, Mobile Ad Hoc Networking Working Group, Internet Draft, http://tools.ietf.org/html/draft-ietf-manet-aodv-13, 37 pages, Feb. 17, 2003.
Clausen, T., Ed., et al., "*Optimized Link State Routing Protocol (OLSR)*", Network Working Group, Request for Comments: 3626, Category: Experimental, http://www.ietf.org/rfc/rfc3626.txt, 71 pages, Oct. 2003.

* cited by examiner

*Primary Examiner* — Clemence Han
(74) *Attorney, Agent, or Firm* — Schwegman Lundberg & Woessner, P.A.

(57) ABSTRACT

Methods for determining paths that satisfy a reliability requirement are generally described herein. The methods may include receiving path information. A reliability requirement is established, and paths that satisfy the reliability requirement are determined. Each path comprises nodes. Configuration of the nodes of the paths according to the reliability requirement is facilitated. A code rate may be determined that corresponds to the reliability requirement. The code rate may indicate network coding to be performed by least a subset of the nodes. The method may also include sending the code rate to the nodes of the paths.

10 Claims, 2 Drawing Sheets

US 8,437,250 B2

DETERMINING PATHS THAT SATISFY A RELIABILITY REQUIREMENT

RELATED APPLICATION

This application claims benefit under 35 U.S.C. §119(e) of U.S. Provisional Application Ser. No. 61/178,873, entitled "Reliability Selection System for a Wireless Network," filed May 15, 2009, by Sung I. Park et al., which is incorporated herein by reference.

TECHNICAL FIELD

This invention relates generally to the field of communications and more specifically to determining paths that satisfy a reliability requirement.

BACKGROUND

Wireless networks are used in a variety of situations to provide wireless communication. In certain situations, however, radio frequency interference can degrade the performance and reliability of wireless links, which can limit the flow of information through the network.

SUMMARY OF THE DISCLOSURE

In accordance with the present invention, disadvantages and problems associated with previous techniques for determining paths may be reduced or eliminated.

In certain embodiments, a method includes receiving path information. A reliability requirement is established, and paths that satisfy the reliability requirement are determined. Each path comprises nodes. Configuration of the nodes of the paths according to the reliability requirement is facilitated.

Certain embodiments of the invention may provide one or more technical advantages. A technical advantage of one embodiment may be that network coding may be used to yield redundancy that satisfies a specified reliability requirement. The specified reliability may be achieved without sacrificing bandwidth efficiency.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
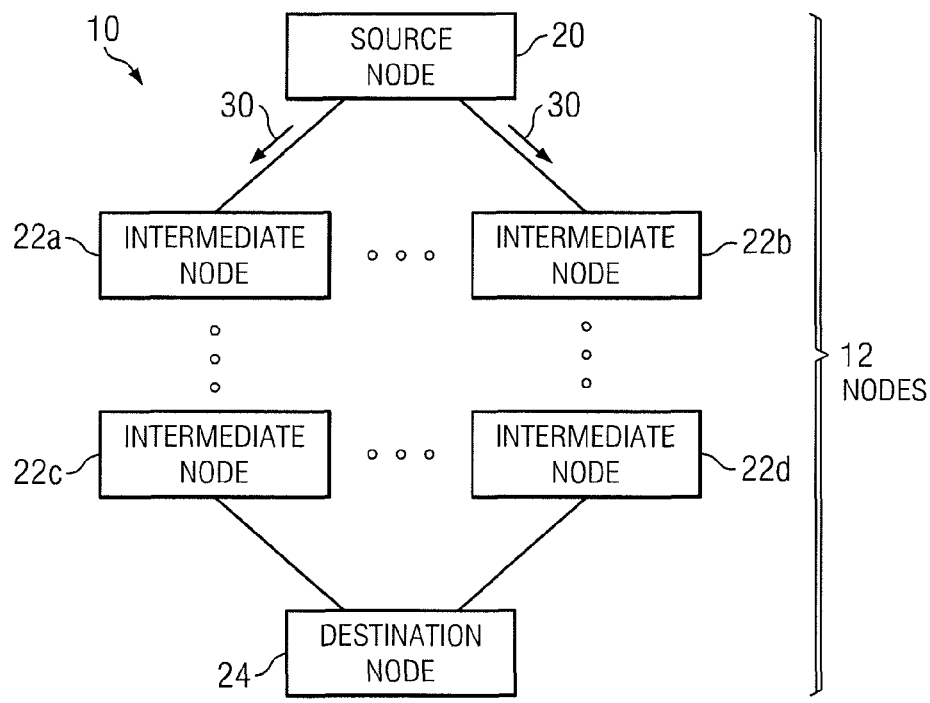
FIG. 1 illustrates an example of a system in which paths that satisfy a reliability requirement may be determined.
Figure 3:
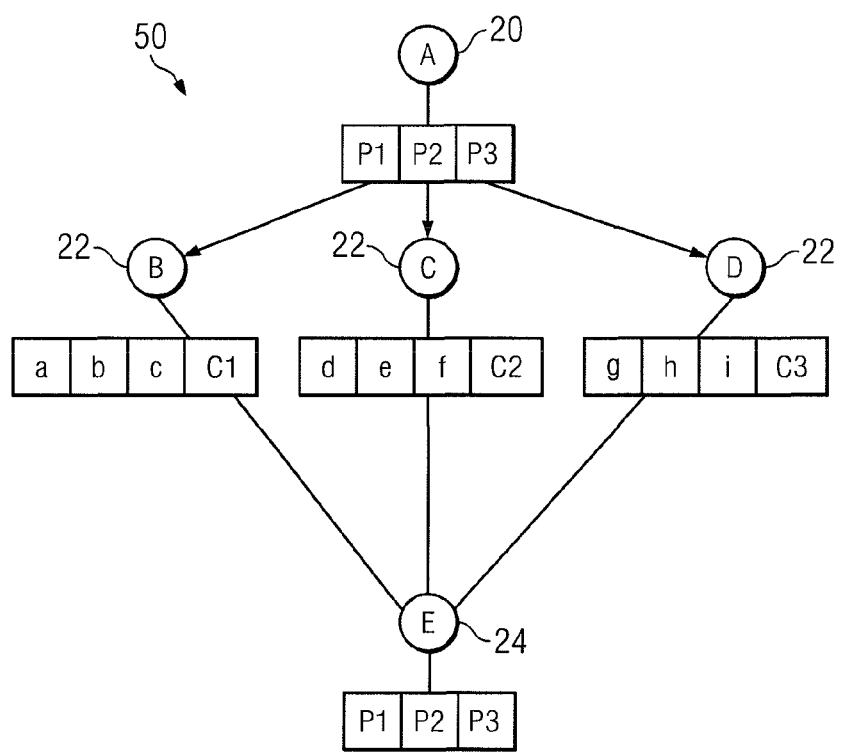
FIG. 3 illustrates an example of random network coding.
Figure 2:
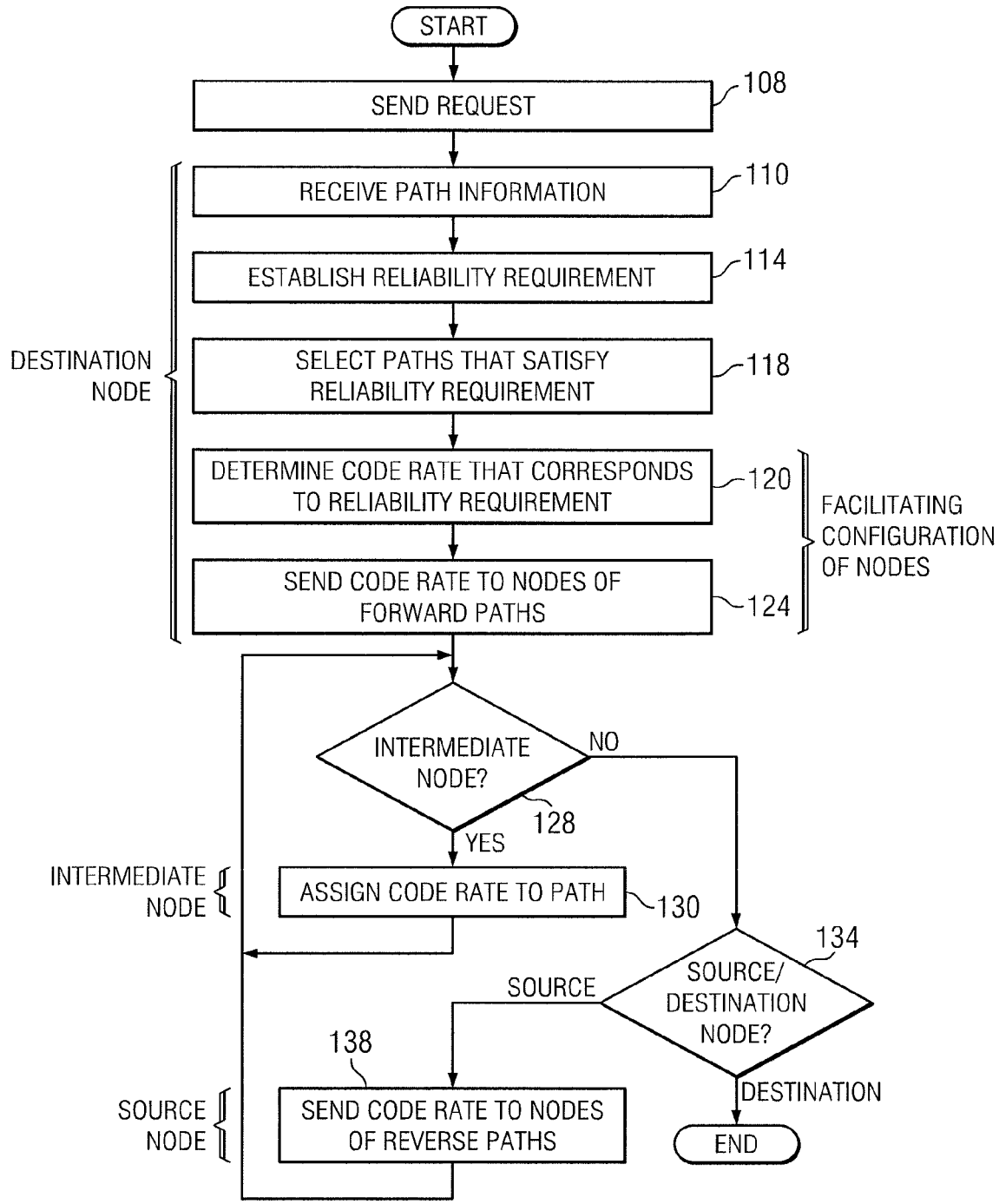
FIG. 2 illustrates an example of a method for determining paths that satisfy a reliability requirement that may be performed by the system of FIG. 1.

Embodiments of the present invention and its advantages are best understood by referring to FIGS. 1 through 3 of the drawings, like numerals being used for like and corresponding parts of the various drawings.

FIG. 1 illustrates an example of a system 10 in which paths that satisfy a reliability requirement may be determined. In certain embodiments, a node (such as a source node) may send a request packet. Another node (such as a destination node) may receive path information gathered by the request packet. The node may establish a reliability requirement, determine paths that satisfy the reliability requirement, and facilitate configuration of nodes according to the reliability requirement. The node may facilitate configuration by determining a code rate that corresponds to the reliability requirement. The code rate indicates network coding to be performed by least a subset of the nodes. The node may send the code rate to the nodes of the paths.

In the illustrated example, system 10 includes nodes (such as nodes 20, 22a-d, and 24) and paths 30 through nodes 12. A node 12 may be any suitable device that communicates packets in any suitable manner, such as a wired and/or wireless device that communicates packets across a wired and/or wireless link. Examples of nodes 12 include clients, routers, and gateways. A client may be any suitable wired and/or wireless device that communicates packets to another node 12. Examples of clients include a personal computer (for example, a laptop), cell phone, or other device. A router or gateway may be any suitable wired and/or wireless device that may connect and forward packets to a communication network.

A packet may travel along a path 30 through nodes 12 such as nodes 20, 22 (22a-d), and 24. In certain embodiments, one or more paths may originate at a source node 20, travel through one or more intermediate nodes 22 to a destination node 24 in a particular order. For a forward path that traverse nodes 12 in a forward order, the reverse path traverses nodes 12 in a reverse order.

In certain embodiments, system 10 may be regarded as implementing a reliability based encoded network (RBEN) framework. The RBEN network may allow users to specify a target reliability requirement and construct paths that match the specified requirement. The reliability requirement may be specified in terms of path diversity (how many paths to use) and/or path redundancy (how many path failures can be tolerated).

In certain embodiments, paths may be constructed using a Split Multipath Routing (SMR) protocol that constructs maximally disjoint paths using request and reply cycles. In the request cycle, source node 20 may broadcast route request (RREQ) packets to neighbor nodes, such as intermediate nodes 22a-b. As each RREQ packet travels through nodes 22 to destination node 24, the RREQ packet collects information about the nodes of the path in a route table. For example, each intermediate node 22 that receives the RREQ packet may insert a route entry into the route table that indicates the previous node from which intermediate node 22 received the packet. Each intermediate node 22 may also insert its own node address into the RREQ packet. When destination node 24 receives the RREQ packet, the RREQ packet includes information about the path traversed by the RREQ packet.

In the reply cycle, destination node 24 may select one or more paths traversed by from the RREQ packets that satisfy a reliability requirement. Destination node 24 may send a route reply (RREP) packet along each selected path to facilitate configuration of nodes according to the reliability requirement. A RREP packet responding to a RREQ packet that traversed a forward path may traverse the reverse path of the forward path.

Destination node 24 may facilitate configuration of nodes according to the reliability requirement in any suitable manner. In certain embodiments, network coding, such as random network encoding, may be used. An example of network coding is described in more detail with reference to FIG. 3. In the embodiments, a code rate that corresponds to the reliability requirement may be determined. The code rate indicates network coding to be performed by least a subset of the nodes. Destination node 24 may send the code rate to the nodes of the paths in the RREP packets. An example of a reply cycle, is described in more detail with reference to FIG. 2.

FIG. 2 illustrates an example of a method for determining paths that satisfy a reliability requirement that may be performed by system 10 of FIG. 1. A request is sent at step 108. For example, source node 20 may broadcast RREQ packets along paths 30. Path information is received at step 110. Destination node 24 may receive the path information in the RREQ packets from source node 20. For example, an RREP packet that travels along a path from source node 20 to destination node 24 may include path information that describes the nodes along the path and the order of the nodes.

A reliability requirement is established at step 114. The reliability requirement may comprise one or more of any suitable requirements that expresses a level of reliability in a communication network. In certain embodiments, the reliability requirement may be expressed by a path diversity redundancy (PDR) ratio that specifies path diversity and/or path redundancy requirements. A path diversity may indicate a number of paths to be selected, and a path redundancy may indicate a number of path failures that can be tolerated. For example, a PDR of x:y may represent a path diversity of x with a path redundancy of y. A path diversity of x may indicate that x multipaths should be used. A path redundancy of y may indicate a failure tolerance of up to y paths. For example, a PDR of 2:1 represents a path diversity of 2 and a path redundancy of 1, which translates to using two multipaths with a failure tolerance of up to 1 path. TABLE 1 illustrates examples of PDR ratios that may be used.

| PDR Ratio | Description |
| --- | --- |
| 1:0 | One path between source and destination nodes. |
| 2:0, 3:0, 4:0, . . . | Two or more path diversity, no redundancy supported. |
| 2:1 | One path failure along two paths supported. |
| 3:1, 4:1, 5:1, . . . | One path failure supported. |
| 4:2, 5:2, 6:2, . . . | Four or more path diversity, two path failures supported. |
| 3:2, 4:3, 5:3, 5:4, 6:3, 6:4, 7:3, 7:4, 7:5, 8:3, 8:4 | Three to six path diversity, two to five path failures supported |

Certain factors may affect the achievable reliability level. Factors may include code block size, source code rate, and cross dissemination of packet diversity inside the network.

Paths that satisfy the reliability requirement are determined at step 118. The paths may be determined in any suitable manner. In certain embodiments, destination node 24 may select paths based on the reliability requirement. For example, destination node 24 may select a number of paths as indicated by path diversity, and may select paths to tolerate the number of failures indicated by the path redundancy.

Configuration of nodes 12 according to the reliability requirement is facilitated at steps 120 and 124. A code rate that corresponds to the reliability requirement is determined at step 120. The code rate indicates network coding to be performed by least a subset of the nodes to satisfy the reliability requirement. For example, the code rate may ensure that the amount of traffic generated along each path satisfies the path redundancy and/or path diversity.

The code rate may be determined in any suitable manner. In certain embodiments, a code rate may be calculated from a mathematical function applied to one or more requirements of the reliability requirement, such as the path diversity and/or a path redundancy. For example, for a path diversity of x and a path redundancy y, the code rate of $1/(x-y)$, where $x>y$, may be used.

In certain embodiments, if the number of redundant paths available is not sufficient to satisfy the path diversity requirements, the code rate may be multiplied by a correction factor Q. Any suitable correction factor Q may be used, for example, Q equal to the path diversity divided by the number of available paths.

The code rate is sent to the nodes 12 of the paths at 124. In certain embodiments, the code rate may be sent in RREP packets. The code rate may be received at an intermediate node 22 at step 128. If code rate is received at an intermediate node 22, the method proceeds to step 130, where the intermediate node 22 assigns the code rate to the path. If code rate is not received at an intermediate node 22, the method proceeds to step 134.

The code rate may be received at source node 20 or destination node 24 at step 134. If code rate is received at source node 20, the method proceeds to step 138, where source node 20 sends the code rate to the nodes of the reverse paths. The code rate may be sent to the nodes of the reverse paths in an acknowledgment (ACK) packet. In certain embodiments, destination node 24 may send a reply to the ACK packet notifying source node 20 that the ACK pack was received. If at step 134 the code rate is received at destination node 24, the method ends.

In certain embodiments, the method may be modified to deal with unidirectional paths that do not have reverse paths. In one embodiment, if source node 20 does not have receive a reply to the ACK packet, source node 20 may assume that the reverse path is not available and omit the forward path. In another embodiment, step 138, where source node 20 sends the code rate to the nodes of the reverse path, may be omitted. Instead, steps 108 through 134 may be performed again to configure the reverse paths from destination node 24 to source node 20.

FIG. 3 illustrates an example of random network coding. In certain embodiments, each intermediate node 22 may encode packets according to a code rate to yield a coded packet. The code rate may be provided by destination node 24 during a reply cycle. In certain embodiments, each intermediate node may select coding coefficients according to the code rate to encode packets. Destination node 24 may use the coding coefficients to extract the original packets.

In the illustrated example, system 5 includes source node A, intermediate nodes i (where i=B, C, and D), and destination node E. System 50 has three redundant paths from source node A to destination node E. Source node A sends packets $P_j$, such as P1, P2, and P3, to intermediate nodes B, C, and D along the paths.

Each intermediate node may randomly select coding coefficients. In the example, node B selects coefficients [a, b, c], node C selects coefficients [d, e, f], and node D selects coefficients [g, h, i]. Each intermediate node i performs matrix computation to encode packets to yield an encoded packet $C_i$, such as encoded packets C1, C2, and C3.

Node A:
$$C1 = [a \quad b \quad c] \begin{bmatrix} P1 \\ P2 \\ P3 \end{bmatrix}$$

Node B:
$$C2 = [d \quad e \quad f] \begin{bmatrix} P1 \\ P2 \\ P3 \end{bmatrix}$$

Node C:
$$C3 = [g \quad h \quad i] \begin{bmatrix} P1 \\ P2 \\ P3 \end{bmatrix}$$

Encoded packets C1, C2, and C3 are transmitted towards destination node E along with the coefficients. Destination node E performs matrix inversion on encoded packets C1, C2, and C3 and the coding coefficients to yield packets P1, P2, and P3.

$$\begin{bmatrix} P1 \\ P2 \\ P3 \end{bmatrix} = \begin{bmatrix} a & b & c \\ d & e & f \\ g & h & i \end{bmatrix}^{-1} \begin{bmatrix} C1 \\ C2 \\ C3 \end{bmatrix}$$

Modifications, additions, or omissions may be made to the systems and apparatuses disclosed herein (such as node 12) without departing from the scope of the invention. The components of the systems and apparatuses may be integrated or separated. Moreover, the operations of the systems and apparatuses may be performed by more, fewer, or other components. For example, the operations of a node 12 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein (such as a node 12) may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
receiving path information;
establishing a reliability requirement;
determining a plurality of paths that satisfy the reliability requirement, each path comprising a plurality of nodes; and
facilitating configuration of the nodes of the paths according to the reliability requirement,
wherein the facilitating configuration further comprises:
determining a code rate that corresponds to the reliability requirement, the code rate indicating network coding to be performed by least a subset of the nodes; and
sending the code rate to the nodes of the paths.

2. A method comprising:
receiving path information;
establishing a reliability requirement;
determining a plurality of paths that satisfy the reliability requirement, each path comprising a plurality of nodes; and
facilitating configuration of the nodes of the paths according to the reliability requirement,
wherein the facilitating configuration further comprises calculating a code rate by applying a mathematical function to a path diversity, the path diversity indicating a number of paths to be selected.

3. A method comprising:
receiving path information;
establishing a reliability requirement;
determining a plurality of paths that satisfy the reliability requirement, each path comprising a plurality of nodes; and
facilitating configuration of the nodes of the paths according to the reliability requirement,
wherein the facilitating configuration further comprises calculating a code rate by applying a mathematical function to a path redundancy, the path redundancy indicating a number of path failures that can be tolerated.

4. A method comprising:
receiving path information;
establishing a reliability requirement;
determining a plurality of paths that satisfy the reliability requirement, each path comprising a plurality of nodes;
facilitating configuration of the nodes of the paths according to the reliability requirement;
receiving a code rate at an intermediate node of a path; and
assigning the code rate to the path.

5. A method comprising:
receiving path information;
establishing a reliability requirement;
determining a plurality of paths that satisfy the reliability requirement, each path comprising a plurality of nodes;
facilitating configuration of the nodes of the paths according to the reliability requirement; and
receiving a code rate at a source node of a forward path; and
sending the code rate to the nodes of a reverse path of the forward path.

6. An apparatus comprising:
an interface configured to receive path information; and
one or more processors configured to:
establish a reliability requirement;
determine a plurality of paths that satisfy the reliability requirement, each path comprising a plurality of nodes; and
facilitate configuration of the nodes of the paths according to the reliability requirement,
wherein to facilitate configuration, the one or more processors are further configured to:
determine a code rate that corresponds to the reliability requirement, the code rate indicating network coding to be performed by least a subset of the nodes; and
send the code rate to the nodes of the paths.

7. An apparatus comprising:
an interface configured to receive path information; and
one or more processors configured to:
establish a reliability requirement;
determine a plurality of paths that satisfy the reliability requirement, each path comprising a plurality of nodes; and
facilitate configuration of the nodes of the paths according to the reliability requirement, wherein to facilitate configuration, the one or more processors are further configured to:
calculate a code rate by applying a mathematical function to a path diversity, the path diversity indicating a number of paths to be selected.

8. An apparatus comprising:
an interface configured to receive path information; and
one or more processors configured to:
establish a reliability requirement;
determine a plurality of paths that satisfy the reliability requirement, each path comprising a plurality of nodes; and
facilitate configuration of the nodes of the paths according to the reliability requirement, wherein to facilitate configuration, the one or more processors are further configured to:
calculate a code rate by applying a mathematical function to a path redundancy, the path redundancy indicating a number of path failures that can be tolerated.

9. An apparatus comprising:
an interface configured to receive path information; and
one or more processors configured to:
establish a reliability requirement;
determine a plurality of paths that satisfy the reliability requirement, each path comprising a plurality of nodes;
facilitate configuration of the nodes of the paths according to the reliability requirement;
receive a code rate at an intermediate node of a path; and
assign the code rate to the path.

10. An apparatus comprising:
an interface configured to receive path information; and
one or more processors configured to:
establish a reliability requirement;
determine a plurality of paths that satisfy the reliability requirement, each path comprising a plurality of nodes;
facilitate configuration of the nodes of the paths according to the reliability requirement;
receive a code rate at a source node of a forward path; and
send the code rate to the nodes of a reverse path of the forward path.

* * * * *

UNITED STATES PATENT AND TRADEMARK OFFICE
CERTIFICATE OF CORRECTION

| | |
|---|---|
| PATENT NO. | : 8,437,250 B2 |
| APPLICATION NO. | : 12/780022 |
| DATED | : May 7, 2013 |
| INVENTOR(S) | : Park et al. |

It is certified that error appears in the above-identified patent and that said Letters Patent is hereby corrected as shown below:

On the Title page, in column 2, Item [56], under "Other Publications", line 2, delete "Routing "" and insert --Routing",--, therefor On the Title page, in column 2, Item [56], under "Other Publications", line 6, delete "(OLSR )" and insert --(OLSR)--, therefor On the Title page, under Item "(57) Abstract", line 9, after "by", insert --at--, therefor In the Specification:

In column 3, line 5, after "by", insert --at--, therefor

In column 3, line 35, after "path.", insert --¶--, therefor

In column 3, line 36, after "used.", insert --¶TABLE 1--, therefor

In column 3, line 42 (Approx.), delete "path" and insert --paths--, therefor

In column 3, line 46 (Approx.), delete "path" and insert --paths--, therefor

In column 3, line 46, (second occurrence), delete "path" and insert --paths--, therefor In column 3, line 48, delete "path" and insert --paths--, therefor In column 3, line 48, (second occurrence), delete "path" and insert --paths--, therefor In column 3, line 49, after "supported", insert --.--, therefor In column 3, line 66, After "by", insert --at--, therefor Signed and Sealed this
Seventeenth Day of September, 2013

Teresa Stanek Rea
*Deputy Director of the United States Patent and Trademark Office*

CERTIFICATE OF CORRECTION (continued)
U.S. Pat. No. 8,437,250 B2

In the Specification:

In column 4, line 39, after "not", delete "have", therefor

In column 4, line 56, Delete "5" and insert --50--, therefor

In column 5, line 60, delete "include" and insert --includes--, therefor

In column 6, line 8, delete "include" and insert --includes--, therefor

In the Claims:

In column 6, line 44, in claim 1, after "by", insert --at--, therefor

In column 7, line 35, in claim 6, after "by", insert --at--, therefor